United States Patent [19] [11] Patent Number: 5,071,687

Shigetoh [45] Date of Patent: Dec. 10, 1991

[54] LAMINATED TUBES AND METHOD OF MANUFACTURING THE SAME

[75] Inventor: Hidetoshi Shigetoh, Fuchu, Japan

[73] Assignee: Ryobi Limited, Hiroshima, Japan

[21] Appl. No.: 465,349

[22] Filed: Jan. 16, 1990

[30] Foreign Application Priority Data

Jan. 17, 1989 [JP] Japan .................................. 1-9391

[51] Int. Cl.⁵ ........................ B29D 23/22; A63B 52/10
[52] U.S. Cl. ................................. 428/35.9; 428/36.3; 428/113; 428/902; 428/408; 428/246; 273/80 R; 156/191
[58] Field of Search ................... 428/35.9, 36.4, 36.91, 428/263, 457, 935, 937, 938, 36.3, 113, 902, 408, 246; 156/189, 190, 191, 173; 273/80 R

[56] References Cited

U.S. PATENT DOCUMENTS 4,119,748  10/1978  Verbauwhede et al. ............. 428/36

Primary Examiner—James J. Seidleck
Assistant Examiner—Charles R. Nold
Attorney, Agent, or Firm—Oliff & Berridge

[57] ABSTRACT

A fishing rod, golf club shaft or the like is produced by a laminated tube, which is formed by winding a prepreg formed of a fiber reinforced sheet around an outer periphery of the mandrel which has cylindrical configuration and is removed after the formation of the laminated tube body. A first winding material wound around either one of the inner, intermediate, and outer portions of the laminated tube body in spiral or twill form with suitable pitches and a second winding material having a good adhesive property with respect to the thermosetting or thermoplastic resin is wound around an outer periphery of the first winding material, the second winding material being composed of yarns or mono-filament of organic or inorganic fiber having a good adhesive property with respect to said resin. The first winding material is wound around the laminated tube body while winding the second winding material around the first winding material.

18 Claims, 4 Drawing Sheets

LAMINATED TUBES AND METHOD OF MANUFACTURING THE SAME

BACKGROUND OF THE INVENTION

This invention relates to a laminated tube utilized for producing a fishing rod, a golf club shaft, or the like and a method of manufacturing the laminated tube.

In a known art of this technical field, a laminated tube for producing a fishing rod or golf club shaft, for example, has been prepared in such manner that a prepreg sheet is formed by impregnating, with a thermosetting and thermoplastic resin solution, an organic or inorganic fiber cloth or an organic or inorganic fiber unidirectional sheet of high strength and high modulus property such as glass fiber or carbon fiber, the prepreg sheet is wound around a mandrel and then subjected to heat hardening treatment to thereby prepare a hollow cylindrical member, and an amorphous metallic tape is wound around the outer periphery of the thus formed hollow cylindrical member in spiral form (as disclosed in the Japanese Utility Model Laid-open Publication No. 60-88727). Furthermore, in the described prior art, an amorphous metallic wire may be disposed in a winding fashion in the interposed layer of the hollow cylindrical member.

However, in the prior art described above, the amorphous metallic tape and the amorphous wire have less adhesive property with respect to the hollow cylindrical prepreg of epoxy resin. For this reason, in case of the amorphous metallic tape wound around the outer periphery of the hollow cylindrical member, the amorphous metallic tape is easily come up due to repeated bending load applied to the cylindrical member and, hence, is easily peeled off. In the case of the amorphous wire wound between the intermediate layers of the hollow cylindrical member, a reinforcing fiber may be broken due to the winding tension of the wire because of a round cross section of the wire and the intermediate layers may be peeled off from each other due to the repeated bending load of the hollow cylindrical member. The progress of the peeling phenomenon causes formation of a gap between the intermediate layers, resulting in the significant lowering of the buckling strength of the formed cylindrical member.

In order to obviate the defects described above, the applicant of this application has proposed a method of preparing a liminated tube in which a metallic foil tape made of such an amorphous material is formed as a cloth tape woven with fibers having high strength and high modulus property such as carbon or glass fiber, the thus formed cloth tape is wound around a laminated tube body formed by winding a fiber reinforced prepreg sheet, and the thus formed laminated tube is then subjected to the heat hardening treatment.

The proposed method may substantially obviate the defects of the peeling of the metallic foil tape and the inter-peeling of the intermediate layers, but involves problems of additional processes such as weaving process and prepreg preparing process, which results in increased costs of a final product.

SUMMARY OF THE INVENTION

An object of this invention is to substantially eliminate defects or drawbacks encountered to the prior art and to provide a laminated tube adapted for a fishing rod or a golf club shaft having a structure providing an improved outer appearance and having an improved surface strength and adhesive property against impact, bending load, and others, and also to provide a method of manufacturing the laminated tube of the characteristics described above with reduced steps and cost involved.

This and other objects can be achieved according to this invention in one aspect by providing a laminated tube adapted for a fishing rod or a golf club shaft comprising:

a laminated tube body formed in a manner to impregnate thermosetting or thermoplastic resin into high strength and high modulus organic or inorganic fiber to prepare a fiber reinforced prepreg sheet which is wound around a substantially cylindrical outer surface of a mandrel which is finally removed; and a layer formed of a first winding material around which a second winding material is wound, the first winding material being wound around at least either one of inner, intermediate, and outer portions of said laminated tube body, said second winding material being composed of a yarn or mono-filament or organic or inorganic fiber having a good adhesive property with respect to thermosetting or thermoplastic resin which is impregnated into said laminated tube body.

The first winding material is formed of a metallic wire, metallic foil tape, or an organic or inorganic yarn on which metal plating or metal vacuum evaporation is performed. The second winding material is wound around the outer periphery of the first winding material in a spiral or twill form with a pitch of 1 to several mm.

In another aspect of this invention, there is provided a method of manufacturing a laminated tube adapted for a fishing rod or a golf club shaft comprising the steps of:

preparing a mandrel to be removed finally after formation of the laminated tube;

winding, around said mandrel, a prepreg sheet formed in a manner to impregnate high strength and high modulus organic or inorganic fibers with thermosetting or thermoplastic resin to form a laminated tube body;

winding a first winding material around either one of the inner, intermediate, and outer portions of said laminated tube body, said first winding material having a second winding material wound around its outer periphery, said second winding material being composed of a yarn or mono-filament of organic or inorganic fiber having a good adhesive property with respect to thermosetting or thermoplastic resin which is impregnated into said laminated tube body;

heat-hardening said laminated tube body; and removing said mandrel from said laminated tube body.

The method further comprises the steps of applying a coating film formed of an epoxy resin or polyurethane resin on the outer peripheral surface of the laminated tube body after winding the first and second winding materials and polishing the surface.

The fiber reinforced prepreg sheet is prepared, in a preferred embodiment, by impregnating thermosetting or thermoplastic resin into an organic or inorganic fiber of high strength and high modulus property and is wound around the outer periphery of the mandrel under pressure.

According to this invention, a laminated tube for a fishing rod or a golf club shaft, for example, is composed of a laminated tube body formed of an organic or inorganic fiber material of high strength and high modulus property and a thermosetting or thermoplastic resin. A first winding material formed of a metallic wire, metallic foil, or an organic or inorganic fiber bundle on which metal plating or metal vacuum evaporation is performed is wound around the outer periphery of the laminated tube body. A second winding material formed of an organic or inorganic fiber yarn or monofilament having a superior adhesive property with respect to a resin of the tube body is wound around the outer periphery of the first winding material. The first winding material is preferably wound while winding the second winding material therearound so as to improve the firm adhesion of the first winding material to the laminated tube body. Accordingly, the peeling phenomenon of the winding material from the laminated tube body can be prevented as well as the peeling phenomenon between the layers forming the laminated tube body itself. The strength of the laminated tube body in the circumferential direction can also be improved to thereby improve the buckling strength, bending strength, bending rigidity, or twisting rigidity of the thus formed laminated tube body.

The winding of the second winding material on which the silane treatment is effected allows the laminated tube as a final product to have a fine outer appearance in spiral or twill form when the first winding material is wound around the outermost layer of the laminated tube body because the second winding material becomes transparent by absorbing resin thereof.

A fishing rod or a golf club shaft produced by utilizing the thus prepared laminated tube can also provide the improved charasteristics as described above.

DESCRIPTION OF THE PREFERRED EMBODIMENTS

Preferred embodiments according to this invention will be described hereunder with reference to the accompanying drawings.

First Embodiment

Figure 1:
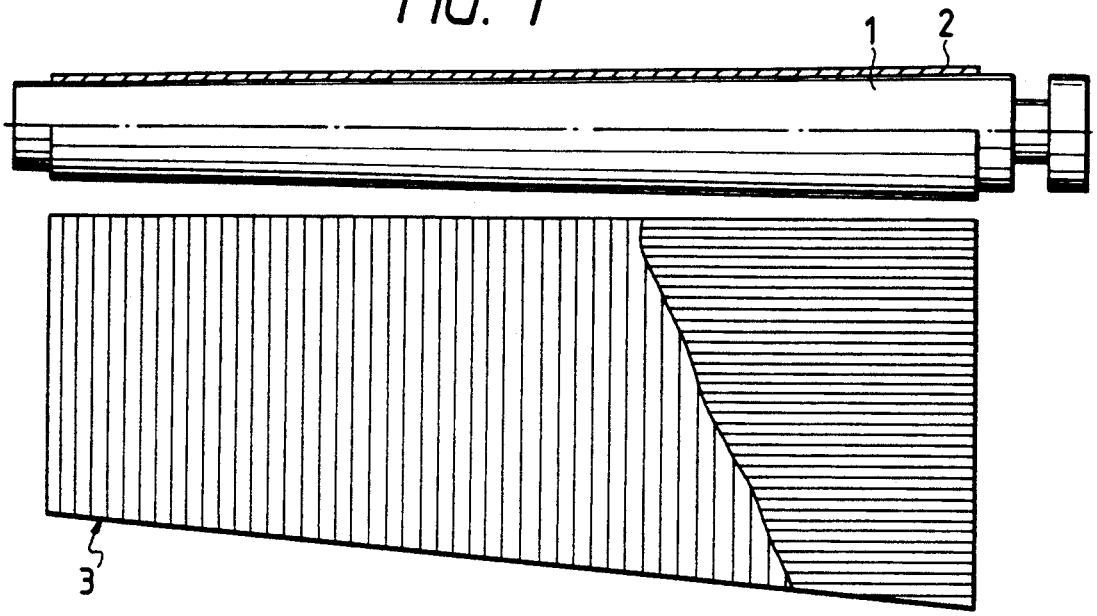
FIG. 1 is a plan view, partially broken away, of a mandrel and a sheet prepreg for forming a laminated tube adapted for a fishing rod or a golf club shaft according to one embodiment of this invention.
Figure 2:
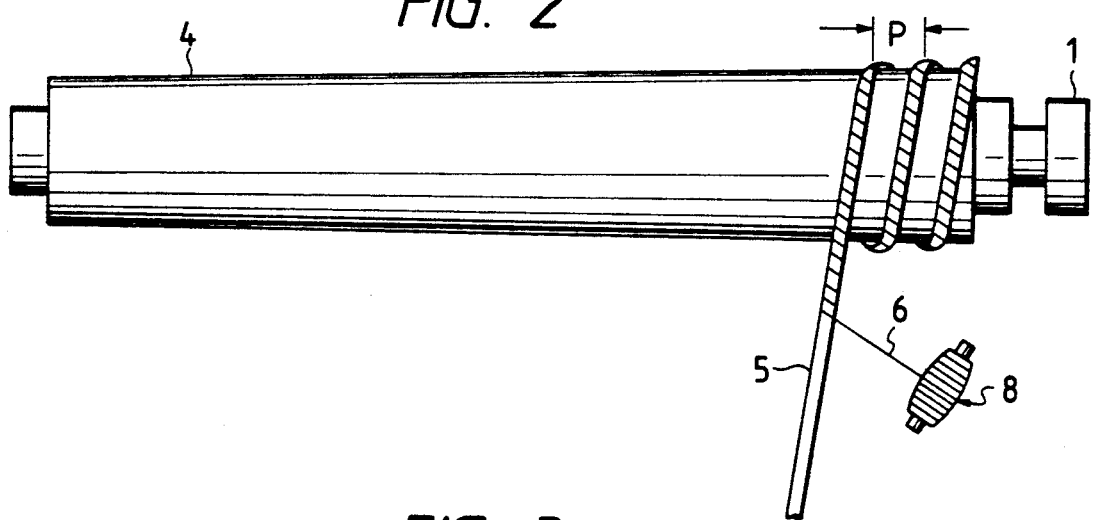
FIG. 2 is a plan view in which a first winding material has been wound around an outer periphery of a laminated tube body.

A laminated tube body 4 of three-layered structure such as shown in FIG. 2 is prepared by the following manner described hereunder with reference to FIG. 1.

A liquid state mold release agent prepared by dissolving a paraffin series wax with toluene, for example, is coated on an outer periphery of a mandrel 1 and then dried to thereby form a release layer 2. A tacking resin, not shown, is coated on the surface of the thus formed release layer 2 and then dried. A sheet prepreg having a cross fiber orientation is formed by impregnating 33 wt. % epoxy resin into a cloth formed of carbon fibers of which fiber weight at 1 $m^2$ is 150 g in the warps and 25 g in the wefts, and the thus formed sheet prepreg is cut into a sheet prepreg 3 which has an enough size to form three plies of the sheet prepeg at the front end and the base end thereof. One end of the prepreg sheet 3 is heated to be tacked to the tacking resin on release layer 2 and then wound around the tacking resin on release layer 2 on the outer periphery of the mandrel to thereby produce a laminated tube body 4 as shown in FIG. 2.

Figure 3:
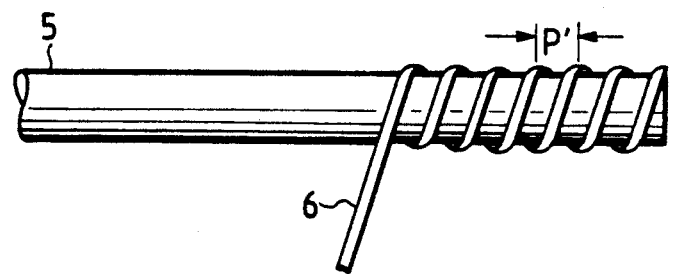
FIG. 3 is a plan view on an enlarged scale of a part shown in FIG. 2 in which a second winding material is wound around the first winding material.

A winding material 5 is prepared by winding, another winding material 6, formed of a glass fiber yarn ECD900-1/0 1Z 6 (Product Number of NITTOBO, 1Z: one twist per one inch) having a diameter of 40μ and a weight of 5.6 g/1000 m on which a silane treatment is done for the epoxy resin, around the outer periphery of a titanium tape having a thickness of 25μ and a width of 0.6 mm in spiral form with a pitch P' of 2 mm as shown in FIG. 3. The thus prepared winding material 5 is wound around the outer periphery of the laminated tube body 4 in a manner shown in FIG. 2 in a spiral form with a pitch P of 5 mm. In these winding processes, the winding material 5 is wound while winding the another winding material 6 formed of the glass fiber yarn around the winding material 5. However, first, the another winding material 6 may be wound around the winding material 5 which is then wound around the tube body 4.

A polypropylene tape, not shown, having a thickness of 30μ and a width of 15 mm is further wound around the outer periphery of the thus formed laminated tube body 4 with the winding material 5 wound therearound under tension of 6 kg.

The laminated tube body 4 is further heat hardened in a kiln for two hours at 130° C.

Figure 5:
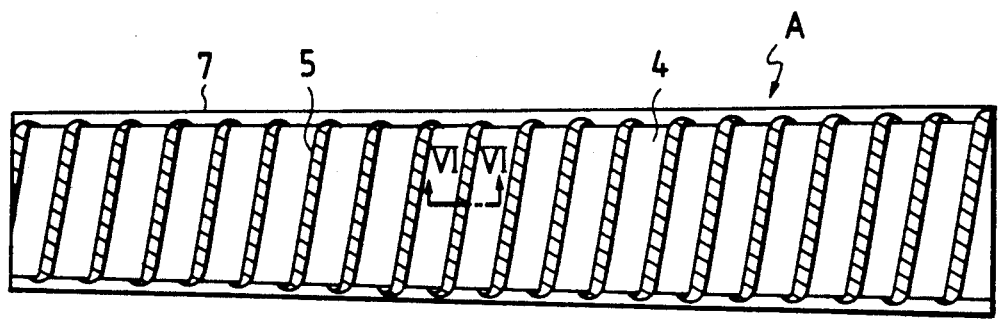
FIG. 5 is a plan view showing a laminated tube body around which the first winding material is wound in spiral form.

The mandrel 1 is removed from the laminated tube body 4 after the cooling thereof and both the ends thereof the tube body 4 are cut. The outer peripheral surface thereof is then polished with a cloth buff, and the polished surface is coated with an epoxy resin or a polyurethane resin to form a painting layer 7, whereby a laminated tube for a fishing rod A, such as shown in FIG. 5, is finally produced.

The thus produced laminated tube A exhibits a fine outer appearance with a fine spiral metallic gloss of the titanium foil tape because the glass fiber yarn 6 wound around the titanium foil tape is made transparent by absorbing the epoxy resin of the tube body 4.

Figure 6:
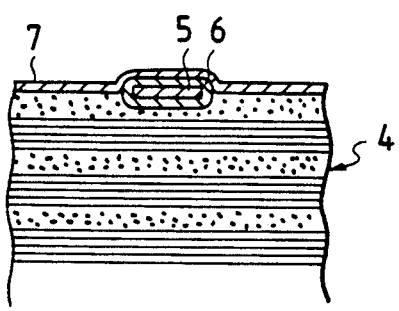
FIG. 6 is a sectional view on an enlarged scale of the laminated tube body taken along the line VI—VI shown in FIG. 5.

Furthermore, as shown in FIG. 6 as an enlarged view, a part of the glass fiber yarn 6 comes into the outer peripheral surface of the laminated tube body 4 and, hence, the titanium foil tape is half embedded in the laminated tube body 4.

Figure 8:
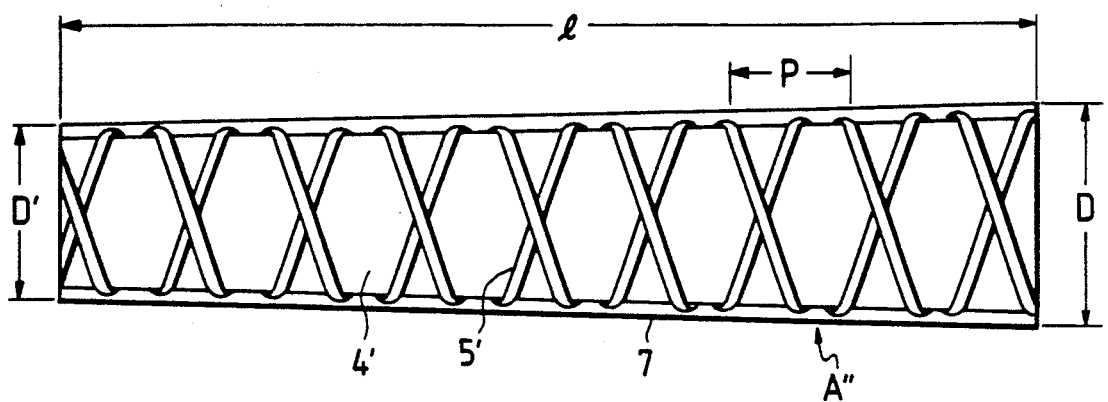
FIG. 8 is a plan view of a laminated tube body similar to that shown in FIG. 7 showing a comparative example with respect to the embodiment of this invention.

In addition, the winding material 6 may be wound around at least either one of the inner, intermediate and outer portions of the tube body 4. The winding material 5 may be wound around the laminated tube body 4 in a twill form as shown in FIG. 8.

Second Embodiment

A sheet prepreg is formed by impregnating 33 wt. % epoxy resin into a cloth material formed of carbon fibers of which fiber weight at 1 m$^2$ is 150 g and the sheet prepreg is cut so as to have its fiber orientations of ±45° with respect to the axis of a mandrel 1 and to have an enough size to form three plies of the sheet at each end portion thereof. The thus cut sheet prepreg is heated to be tacked to the mandrel 1 at both the ends and wound therearound under pressure to thereby form an inner layer of a laminated tube body.

Another sheet prepreg is formed by impregnating 33 wt. % epoxy resin into a cloth material formed of carbon fibers of which fiber weight at 1 m$^2$ is 150 g and the sheet prepreg is cut so as to have its orientations of ±0° with respect to the axis of the mandrel and to have an enough size to form three plies of the sheet at each end portion thereof. The thus cut sheet prepreg is wound under pressure around the outer periphery of the aforementioned inner layer to thereby form a laminated tube body 4'.

In the next step, as described with reference to the first embodiment, the winding material 5 is prepared by winding another winding material formed of a glass fiber yarn ECD900-1/0 1Z 6 around the outer periphery of a titanium tape in spiral form with a pitch P' of 1 mm. The winding maternal 5 is wound around the outer periphery of the laminated tube body 4' with a pitch P of 18 mm in spiral form while winding the glass fiber yarn around the winding material 5.

Figure 7:
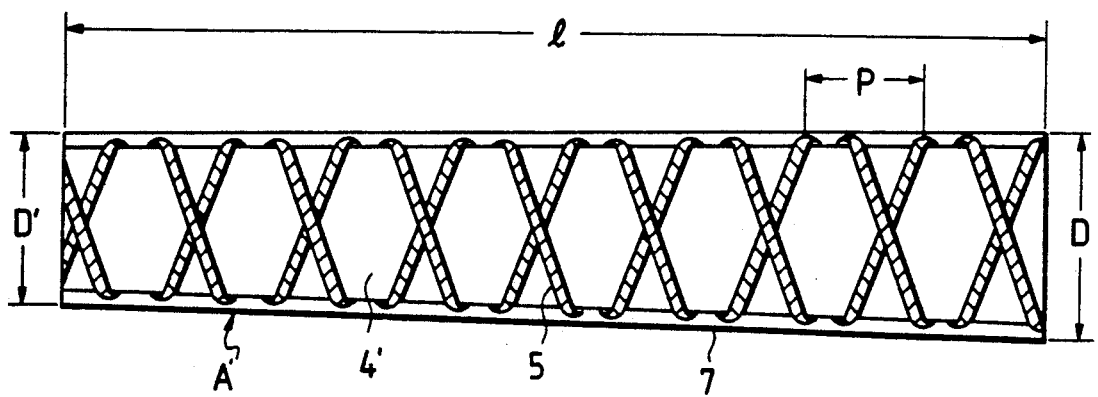
FIG. 7 is a plan view showing a laminated tube body around which the first winding material is wound in a twill form.

A painting layer 7 is formed on the surface of the thus formed laminated tube body 4' by substantially the same manner as that described with reference to the first embodiment whereby a laminated tube A' for a golf club shaft shown in FIG. 7, for example, is produced.

Comparative Example

As shown in FIG. 8, a laminated tube body 4' formed by substantially the same manner as that described with reference to the second embodiment is prepared. A titanium foil tape 5', as a winding material, having a thickness of 25μ and a width of 0.6 mm is wound around the laminated tube body 4' in a twill form with a pitch P of 18 mm. A painting layer 7 is formed on the surface of the thus formed laminated tube body by substantially the same manner as that described with reference to the first embodiment, whereby a laminated tube A'' for a golf club shaft is produced.

The thus produced laminated tube for the golf club shaft has a tip end having a diameter D' of 8.5 mm, a butt having a diameter D of 15.2 mm, an axial length 1 of 1120 mm, a weight of 78 g, and a flex of 150 mm.

The laminated tube A' of the second embodiment has substantially the same diameters D and D', axial length 1 and the flex as those of the laminated tube A'' of the Comparative Example except only the weight of 79 g.

Golf clubs are produced by mounting heads, grips, and others to the respective laminated tubes A' and A'' of the first embodiment and the Comparative Example.

Test shots were repeatedly carried out by using these golf club shafts produced with the laminated tubes A' and A'', and the tests resulted in that the titanium foil tape of the golf club shaft of the laminated tube A'' of the Comparative Example was peeled off at 153 shots. On the other hand, there was found no abnormality even at 1000 shots for the golf club shaft produced with the laminated tube 4'.

The manufacturing processes of the laminated tubes A and A' of the first and second embodiments according to this invention will be described hereunder with reference to FIGS. 1, 2, 5, and 7 in more detail.

First Process

A mold release agent is first appled to the mandrel 1. A fiber reinforced sheet prepreg 3 is prepared by impregnating a thermosetting or thermoplastic resin into an organic or inorganic fiber having high strength and high modulus property. The sheet prepreg 3 is wound under pressure around a mandrel 1 which is coated with a tacking resin to thereby produce a laminated tube body 4 or 4'.

Second Process

A winding material 5 to be wound is formed of a metallic wire, metallic foil tape or an organic or inorganic yarn on which metal plating or metal vacuum evaporation is effected.

An organic or inorganic yarn or mono-filament having a good adhesive property to the resin with which the tube body 4 is impregnated is wound around the outer periphery of the winding material 5 in a spiral form with a pitch P' of 1 to several mm. The winding material 5 is wound around the inner layer, intermediate layer or outermost periphery of the laminated tube body 4 or 4' prepared in the first process in spiral or twill form while winding the organic or inorganic yarn or mono-filament around the winding material 5.

Third Process

The laminated tube body 4 or 4' formed by the second process is then heated and hardened in a kiln, for example, and the mandrel 1 is removed from the laminated tube body after cooling the same. The outer peripheral surface is polished and an epoxy resin and a polyurethane resin are applied on the polished surface to form a painting layer 7.

In the foregoing processes, the laminated tube body 4 or 4' may be formed of a carbon, black lead, polyamide armide, boron, ceramic, or the like fiber.

Figure 4A:
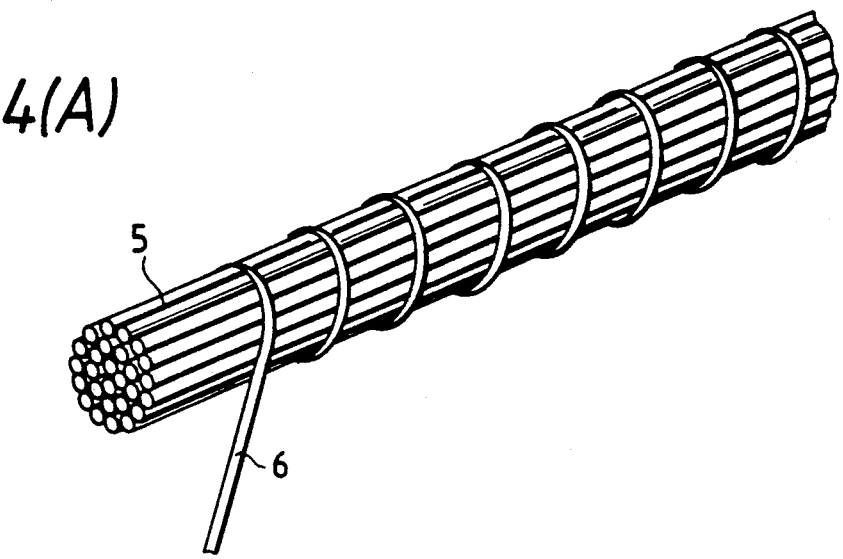
FIGS. 4A, 4B and 4C are perspective views showing the winding conditions of the second winding material around various types of the first winding materials.
Figure 4B:
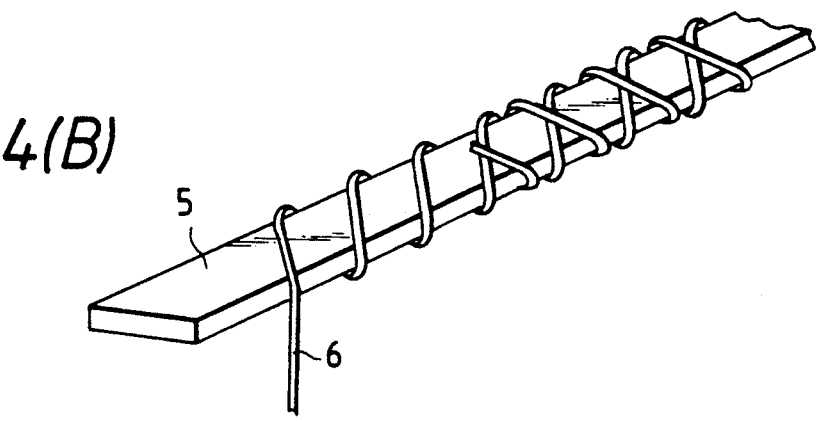
Figure 4C:
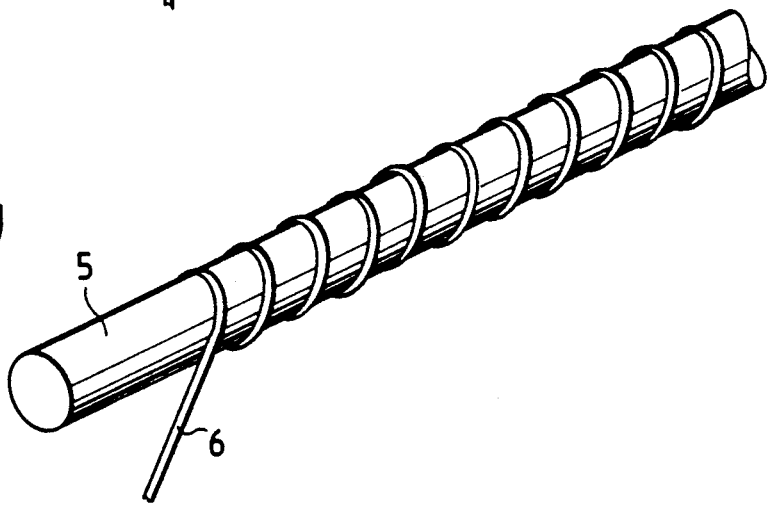

The winding material 5 to be wound around the laminated tube body 4 or 4' may be selected as shown in FIGS. 4A to 4C from a metallic wire or foil tape or mono- or multi-filament formed of such as a titanium, amorphous, stainless steel, beryllium copper, or an organic or inorganic yarn of carbon, black lead, polyamide armide, or the like having an outer peripheral surface on which a metal plating or metal vacuum evaporation is effected so as to exhibit a metallic gloss. These materials have commonly circular or rectangular cross sections and have outer appearances of linear, foil, or tape shape.

Furthermore, it is preferred to utilize, as a material to be wound around the winding material 5, glass fiber yarns or mono-filament to which the silane treatment is effected to make the material transparent after the formation, but a nylon mono-filament or carbon fiber yarn may be utilized.

The material 6 to be wound around the winding material 5 is wound at a winding speed selected in connection with the winding speed of the winding material 5 with respect to the body 4 or 4', in a preferred manner, by rotating a bobbin 8 shown in FIG. 2 about the outer periphery of the winding material 5, and in this manner, the desirable winding pitch P' will be obtained by changing the rotation speed of the bobbin 8.

Further, the material 6 may be wound around the winding material 5 in a twill form as partially shown in FIG. 4B.

It is also desired to wind the yarns or mono-filament 6 around the outer periphery of the winding material 5 with a surface hiding or covering ratio of 5 to 100% with respect to whole the surface thereof.

Figure 9:
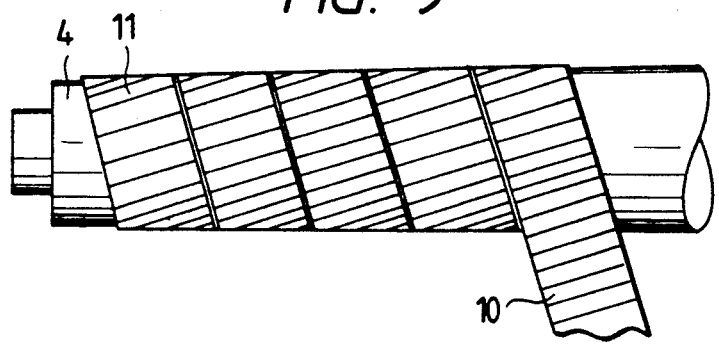
FIG. 9 is a plan view of a laminated tube of another embodiment.
Figure 10:
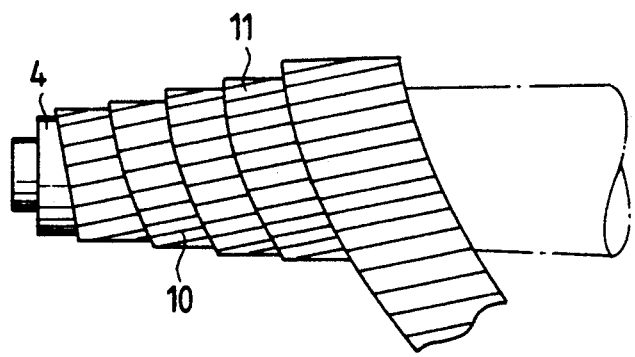
FIG. 10 is a plan view of a laminated tube of still another embodiment.

In the above enbodiments, the winding material 5 is wound around the laminated tube body 4. However, as shown in FIG. 9, a winding material 10 with another winding material 11 may be formed in shape of tape having a predetermined width so as to be wound therearound continuously (without an interval). Furthermore, the winding material 10 may be, as shown in FIG. 10, wound around in a manner to be partially piled up. In these cases, specific modulus of elasticity is decreased to cause a golf ball to be released late from the golf club head when the ball is struck. Therefore, the golf ball can be easily controlled.

It is to be understood by persons skilled in the art that this invention is not limited to the described embodiments and many other change and modifications may be made according to this invention without departing scope and spirit of the apended claims.

What is claimed is:

1. A laminated tube adapted for a fishing rod or a golf club shaft comprising:
   a laminated tube body formed by impregnating thermosetting or thermoplastic resin into high strength and high modulus organic or inorganic fiber to prepare a fiber reinforced prepreg sheet which is wound around a substantially cylindrical outer surface of a mandrel which is finally removed; and
   a layer formed of a metallic first winding material having a second winding material wound around said first winding material, said first winding material being wound around either one of inner, intermediate, and outer portions of the laminated tube body,
   said second winding material being composed of a yarn or mono-filament of organic or inorganic fiber having a good adhesive property with respect to the thermosetting or thermoplastic resin which is impregnated into the laminated tube body,
   said first and second winding materials being wound in spiral or twill form.

2. A laminated tube according to claim 1, wherein said first winding material is formed of a metallic wire or mono-or multi-filament.

3. A laminated tube according to claim 1, wherein said first winding material is formed of a metallic foil tape.

4. A laminated tube according to claim 1, wherein said first winding material is formed of an organic or inorganic yarn effected with metal plating or metal deposition.

5. A laminated tube according to claim 1, wherein said second winding material is wound around an outer periphery of said first winding material in spiral or twill form with a pitch of 1 to several mm.

6. A laminated tube according to claim 1, wherein said second winding material comprises a material that becomes transparent by absorbing resin with which said laminated tube body is impregnated.

7. A laminated tube according to claim 1, further comprising a painting layer applied on an outer peripheral surface of said laminated tube body after winding said first and second winding materials and polishing the surface.

8. A method of manufacturing a laminated tube adapted for a fishing rod or a golf club shaft comprising the steps of:
   preparing a mandrel to be removed finally after formation of said laminated tube;
   winding, around said mandrel, a prepreg sheet formed by impregnating high strength and high modulus organic or inorganic fibers with a thermosetting or thermoplastic resin to form a laminated tube body;
   winding a first winding material around either one of the inner, intermediate, and outer portions of said laminated tube body, said first winding material having a second winding material wound around its outer periphery, said second winding material being composed of a yarn or mono-filament of organic or inorganic fiber having a good adhesive property with respect to the thermosetting or thermoplastic resin which is impregnated into the laminated tube body, said first and second winding materials being wound in a spiral or twill form;
   heat-hardening said laminated tube body; and
   removing said mandrel from said laminated tube body.

9. A method according to claim 8, wherein said first winding material is wound around said laminated tube body while winding said second winding material around said first winding material.

10. A method according to claim 8, wherein said second winding material is wound around said first winding material and then said first winding material is wound around said laminated tube body.

11. A method according to claim 8, wherein said first winding material is formed of a metallic wire or mono- or multi-filament.

12. A method according to claim 8, wherein said first winding material is formed of a metallic foil tape.

13. A method according to claim 8, wherein said first winding material is formed of an organic or inorganic yarn effected with metal plating or metal deposition.

14. A method according to claim 8, wherein said second winding material is wound around an outer periphery of said first winding material in spiral or twill form with a pitch of 1 to several mm.

15. A laminated tube according to claim 8, wherein said second winding material comprises a material that becomes transparent by absorbing the resin with which said laminated tube body is impregnated.

16. A method according to claim 8, further comprising the steps of polishing an outer peripheral surface of said laminated tube body, and applying a painting layer formed of an epoxy resin and a polyurethane resin on an outer peripheral surface of said laminated tube body.

17. A method according to claim 8, wherein said first and second winding materials are wound at winding speeds related to each other and with predetermined winding pitches.

18. A method according to claim 8, wherein said second winding material is wound around an outer periphery of said first winding material with a covering ratio of about 5 to 100%.

* * * * *